United States Patent [19]
Mori

[11] 3,792,631
[45] Feb. 19, 1974

[54] SPEED RATIO COMPARATOR UNIT FOR CONTROL SYSTEM OF AUTOMOTIVE AUTOMATIC TRANSMISSION

[75] Inventor: Yoichi Mori, Yokohama, Japan

[73] Assignee: Nissan Motor Company, Limited, Yokahama, Japan

[22] Filed: Jan. 10, 1972

[21] Appl. No.: 216,408

Related U.S. Application Data

[63] Continuation-in-part of Ser. No. 872,325, Oct. 29, 1969, abandoned.

[30] Foreign Application Priority Data
Oct. 30, 1968  Japan.............................. 43-78834

[52] U.S. Cl..................... 74/866, 74/336, 74/752 D
[51] Int. Cl............................................. B60k 21/00
[58] Field of Search ..... 74/336, 752 A, 752 D, 365, 74/866

[56] References Cited
UNITED STATES PATENTS

| | | | |
|---|---|---|---|
| 2,952,346 | 9/1960 | Costa et al. | 74/365 X |
| 3,068,715 | 12/1962 | Brennan et al. | 74/336 X |
| 3,335,830 | 8/1967 | DeCastelet | 74/365 X |
| 3,417,640 | 12/1968 | Schmidt et al. | 74/866 |
| 3,439,564 | 4/1969 | Scholl et al. | 74/866 |
| 3,446,097 | 5/1969 | Schmidt et al. | 74/866 X |
| 3,478,851 | 11/1969 | Smyth et al. | 74/866 X |
| 3,545,307 | 12/1970 | Bildat | 74/866 X |

*Primary Examiner*—Benjamin W. Wyche
*Assistant Examiner*—J. Reep

[57] ABSTRACT

An electronic control device used in an automatic transmission of an automotive vehicle having a plurality of forward gear ratios, for generating a plurality of corresponding synchronized signals when the automatic transmission is in a synchronized condition between the engine speed and the vehicle speed multiplied by one of the gear ratios at which ratio shifting of the transmission is to be effected. In the control device, the engine speed is detected at an output shaft of the engine, while the vehicle speed is detected at a driven shaft of the engine and is multiplied by the particular gear ratio selected to be shifted thereto. These two signals are then converted into respective d.c. voltages and subsequently compared with each other by a set of voltage dividers. These voltage dividers render in turn a set of corresponding transistors when the divided voltage assumes a predetermined level dictating that the automatic transmission is in the synchronized condition. With at least one of the transistors rendered conductive, a set of corresponding relays are actuated to switch-over its contacts to generate one of the synchronized signals at a correspondingly different output terminal through a governor switch. When the automatic transmission is in an a synchronized condition, on the other hand, the control device generates at its another terminal through the governor switch a throttle control signal indicating that the throttle valve should be opened or closed to make the engine speed change to be synchronized speed in the particular running condition.

1 Claim, 5 Drawing Figures

INVENTOR
YOICHI MORI

SPEED RATIO COMPARATOR UNIT FOR CONTROL SYSTEM OF AUTOMOTIVE AUTOMATIC TRANSMISSION

This is a continuation-in-part of application Ser. No. 872,325, filed Oct. 29, 1969, now abandoned.

The present invention relates to an automatic transmission, and more particularly to an electronic control device which is adapted to control the shift timings of the transmission by detecting changes in vehicle and engine speeds.

In order to effectively utilize the engine output power in an automotive vehicle, the gear ratio in the power train should be increased with the engine speed increased if the vehicle is running at a low speed. If a certain value of gear ratio is selected in the transmission, the engine speed is equal to the product of the speed of the driven shaft of the vehicle and the thus selected gear ratio. In this instance the transmission is said to be operating in a "synchronized condition" and the engine speed providing such synchronized speed is hereinafter referred to as a "synchronized engine speed."

After the gear ratio has been changed in the transmission, the engine operates initially at the synchronized speed for the previous gear ratio, not the synchronized speed for the newly selected gear ratio. In the manually controlled transmission of a sliding mesh type, for example, it is necessary to uncouple a dog clutch which is mounted between the engine and the transmission, and to simultaneously release the accelerator pedal for temporarily decelerating the engine, when an upshift is to be effected. The clutch disc and the input shaft of the transmission continue rotating if the dog clutch remains uncoupled. If, then, the driver intends to engage the dog clutch with another gear to select a desired reduction ratio, a synchronizer operates to change the speed of the clutch disc or of the input shaft to the desired synchronized speed corresponding to the desired gear ratio, thus permitting the dog clutch to be coupled with the gear.

Unless the transmission is equipped with a synchronizer, the driver is required to: uncouple the clutch and dog clutch; temporarily re-couple the former clutch to increase the engine speed to the synchronized speed for matching the clutch and input shaft speeds with the desired gear ratio; and uncouple the clutch again to have the dog clutch coupled with the desired gear. These succeeding operations as a whole are called "double clutching".

The double clutching operation, however, requires skillful technique because it is the driver himself who determines whether or not the synchronized speed of the engine is reached. Where shiftings are to be carried out in an automatic fashion, in particular, the double clutching operation is almost unfeasible for practical purposes. This is the reason why a powerful synchronizer is used in automatic transmissions of up-to-date automotive vehicles.

To overcome these and other drawbacks inherent in the conventional transmission and to offer increased ease and reliability of the gear shifting operation of automatic transmissions, the present invention contemplates to provide a novel and improved control device for controlling the short timings of the automatic transmission by generating a synchronized signal which is derived from the engine and driven shaft speeds being detected when shiftings are to be effected.

The features and advantages of the present invention will become apparent from the following description taken in conjunction with the accompanying drawings, in which.

Figure 1:
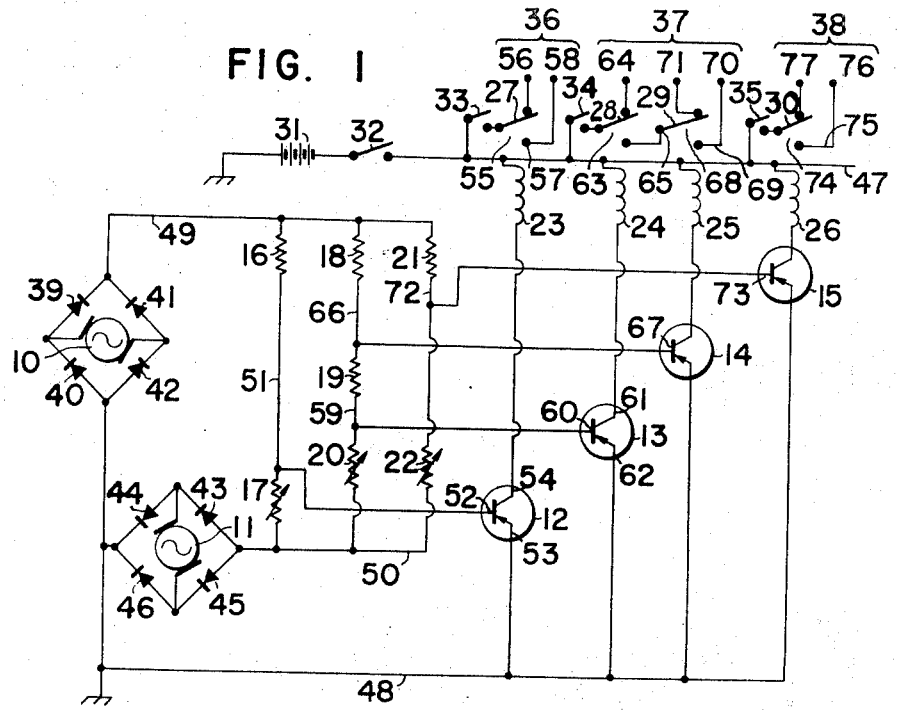
FIG. 1 is a connection diagram showing the control device for use in an automatic transmission according to the present invention.

FIG. 1 shows the control device for generating a plurality of synchronized signals when the automatic transmission is in a synchronized condition between the engine speed and the vehicle speed for effecting shifting of the transmission at a gear ratio selected. The control device comprises a first tachometric generator 10 connected with a driven shaft such as the wheel axle (not shown) for generating an a.c. voltage proportional to the speed of the driven shaft, and a second tachometric generator 11 connected with the output shaft of the vehicle engine for generating an a.c. voltage proportional to the speed of the engine output shaft. Four PNP transistors 12, 13, 14 and 15 are provided for being rendered conductive in response to the relative outputs of the first and second generators. A voltage divider means respectively including a pair of serial resistor elements 16 to 22 for setting the base potentials of the transistors 12, 13, 14 and 15. The resistance ratio of each pair of the resistor elements is predetermined in accordance with one of speed reduction ratios of the transmission so as to divide therebetween the voltage level of the outputs of the first and second generators. Relays including solenoid coils 23, 24, 25 and 26 are connected to the collector circuits of the transistors 12, 13, 14 and 15, respectively, for respectively actuating relay switches 27, 28, 29 and 30 when energized in combination by the current flowing through the collector of the corresponding transistors. These relays switches 27–30 may assume one of two positions respectively. Indicated by 31 is a d.c. storage battery connected with the relays and with the collectors of the transistors through the solenoid coils.

The device also comprises a power switch 32 for switching the d.c. potential from the storage battery 31 to the control circuit of the device, and governor switches 33, 34 and 35. The governor switch 33 is closed when first or low gear ratio of the transmission is to be effected. The governor switch 34 is closed when second or intermediate gear ratio is to be effected. The governor switch 35 is closed when third or high gear ratio is to be effected.

In the relay switches 27, 28 and 29 are provided output terminals 36, 37 and 38 for synchronized and asynchronized signals of the first, second and third gears, respectively. These synchronized signals are produced respectively at one of the output terminals 36, 37 and 38.

The device further comprises a set of rectifying means 39, 40, 41 and 42 connected in a bridge form for rectifying the a.c. voltage derived from the tachometric generator 10 into a d.c. voltage proportional to the vehicle shaft speed. Another set of rectifying means 43, 44, 45 and 46 are provided in a bridge form for rectifying the a.c. voltage derived from the tachometric generator 11 into a d.c. voltage proportional to the engine speed.

In the voltage divider means the resistor elements 16 and 17 are used for the transistor 12, the resistor elements 18, 19 and 20 for the transistors 13 and 14, and the resistor elements 21 and 22 for the transistor 15. Of these elements the resistors 17, 20 and 22 may be variable resistors for adjusting the voltage level divided in accordance with one of the gear ratios to be shifted thereinto.

The storage battery 31 of the vehicle supplies voltage to the negative line 47 and the positive line is connected to the ground. A line 48 is grounded so that the voltage thereof is zero and a line 49 is connected to one side of the bridge of the rectifying means 39, 40, 41 and 42 so that it represents a d.c. voltage of $+Vc$ derived from the tachometric generator 10. A line 50 is connected to one side of the bridge of the rectifying means 43, 44, 45 and 46 so that it represents a d.c. voltage of $-Ve$ derived from the tachometric generator 11. The voltage $+Vc$ is thus proportional to the turbine shaft speed of the transmission, or to the driven shaft to the transmission and the voltage $-Ve$ to the output shaft speed of the engine. The potential of a line 51 is derived from the following equation since the line 51 is connected at one end through the resistor element 16 to the line 49 at the voltage of $+Vc$ and on the other through the resistor element 17 to the line 50 at the voltage of $-Ve$:

$$V = [R17\ Vc/(R16 + R17)] - [R16\ Ve/(R16 + R17)] \quad (1)$$

The line 51 is connected to the base 52 of the transistor 12 so that the potential of the base or the line 51 controls the conduction of the transistor 12 through its emitter 53 and collector 54.

Now, assuming that only the engine speed changes while the vehicle speed is maintained constant and that the transmission reaches a shifting point to shift its gear ratio, the voltage $Vc$ remains constant whilst the voltate $Ve$ changes depending upon the engine speed. If the transmission is to be shifted down from the second gear ratio to the first gear ratio, and if the potential of the conductor 51 is still positive although as the engine speed is lower than the synchronized engine speed for the first gear ratio, the collector current will not flow through the transistor 12 because the base potential thereof is positive. Meanwhile, the governor switch 33 of the transmision is closed to supply the potential of the energy source 31, to the relay switch 27. In this instance, the current will now flow through the relay coil 23 so that the potential is then introduced through an arm 55 of the switch 27 to an output terminal 56 to thereby indicate that the transmission is an asynchronized condition and that the engine speed is lower than the synchronized engine speed for the first gear ratio and to thereby provide a throttle control signal at the terminal 56 so as to open the throttle valve of the engine to equalize the engine speed with the synchronized speed as soon as possible. When the engine speed increases with the throttle opened wider to reach the particular synchronized speed, and when the voltage at the tachometric generator 11 increases to a sufficient level, the potential at the base 52 of the transistor 12 becomes negative so that the collector current will flow through the relay coil 23, whereby the arm 55 of the switch 27 is switched over to the other contact 57. Since the governor switch 33 is kept closed all the while, the first synchronized signal is introduced through the contact 57 to the other output terminal 58 indicating that the transmission is then in a synchronized condition and that the engine speed is equal to the synchronized engine speed. This synchronized signal may also indicate that the throttle valve of the engine should be reset to a normal position as determined solely by the accelerator pedal. Here, in the case of an automatic transmission, a friction element such as low-and-reverse brake is actuated by a suitable actuator (not shown), which is responsive to the first synchronized signal appearing at the terminal 58, to obtain a first gear ratio in the transmission. This switchover of the arm 55 of the switch 27 may preferably be effected slightly before the engine speed reaches the corresponding synchronized speed because there is a time delay in shifting of the transmission.

When the transmission is shifted down from the third to second gear ratio, on the other hand the transistor 13 operates similarly to the transistor 12, except that, the resistor elements 18, 19 and 20, instead of the resistor elements 16 and 17, are connected to each other to form lines 59 and 66 therebetween. Through the resistor elements 18 and 19 and the lines 49 and 66 is applied the potential $Vc$ and through the resistor element 20 and the line 50 is applied the potential $Ve$, both to the line 59. The line 59 is connected to the base 60 of the transistor 13, which operates similarly to the transistor 12. Assuming that by the time when the engine speed reaches the synchronized engine speed for the second gear ratio of the transmission, the engine speed is still below the particular synchronized speed, the potential of the portion of the line 59 between the resistor elements 19, 20 is positive, and therefore the collector current will not flow through the collector 61 and emitter 62 of the transistor 13 and therefore through the relay coil 24. Meantime, the governor switch 34 has been closed since the downshifting was intended from the third to second gear ratio, so that an arm 63 of the switch 28 contacts with the side of an output terminal 64 thereof, indicating that the transmission is in an asynchronized condition and that the engine speed is lower than the synchronized engine speed for the second gear ratio. A current indicating a throttle control signal flows in this condition from the storage battery 31 through the power switch 32 and the switch 34 to the output terminal 64 so as to open the throttle valve for shortening this shifting time period. When the engine speed increases to the particular synchronized speed with the throttle valve opened wider, as previously described, the voltage $Ve$ increases so that the base potential of the transistor 13 decreases to obtain a negative value. A current will thus flow through the solenoid coil 24 to energize the same whereupon the arm 63 of the relay switch 28 is switched over to the side of a terminal 65 so that the synchronized signal is fed to an output terminal 71 indicating that the engine speed is synchronized with the particular synchronized speed and that the throttle valve (not shown) should be reset to the normal position.

When, on the other hand, the transmission is to be shifted up from the first to second gear ratio, the governor switch 33 for the first gear ratio is opened while the governor switch 34 for the second gear ratio is closed by a second shifting signal from a governor (not shown) separately provided in the transmission. The operation of this governor is disclosed in the applicant's co-pending Patent Application Ser. No. 872,124 now abandoned. In short, these first, second and third governor switches 33, 34 and 35 are respectively closed only when shifting to a corresponding gear ratio. Since the first gear ratio is larger than the second gear ratio, the engine speed for the first gear ratio is much higher than the synchronize speed for the second gear ratio, so that the negative voltage $Ve$ of a larger absolute value is derived from the bridge rectifiers 43 to 46 when an upshift is to be effected from the first to second gear ratio. The voltage applied through the line 66 to the base 67 of the transistor 14 is then negative so that the current continues flowing through the solenoid coil 25 during such upshift. In this instance, the relay coil 24 is also energized through the transistor 13 to provide a connection between the governor switch 34 and relay switch 29 through the relay switch 28. Thus, an arm 68 of the switch 29 and the arm 63 of the switch 28 are switched over to the sides of terminals 69 and 65, respectively, thereby producing a throttle control signal at an output terminal 70, indicating that second engine speed is above the synchronized speed and that the throttle valve should be closed to decrease the engine speed. When the engine speed decreases to a sufficient level with the throttle valve narrower, the negative voltage $Ve$ derived from the rectifying means 43, 44, 45 and 46 decreases in absolute value so that the potential of the line 66 increases to zero and then to a positive value, thereby the transistor 14 being rendered non-conductive to prohibit the current to flow through the relay coil 25. Thus, the arm 68 of the relay switch 29 is switched back to another output terminal 71, indicating that the engine speed is equalized with the second synchronized speed and that the throttle valve should be reset to the normal position.

When the automatic transmission is to be shifted up from the second to third speed, the governor switch 34 is opened while the governor switch 35 is closed by a third shifting signal supplied from the governor. A line 72 connected to the base 73 of the transistor 15 has ends respectively connected through the resistor element 21 to the line 49 of the potential $Vc$ and through the resistor element 22 to the line 50 of the potential $Ve$. Since the second gear ratio at the second speed is greater than the third gear ratio at the third speed, the engine speed is then higher than the third synchronized speed required for shifting up from the second to third speed. As a result, the negative voltage $Ve$ having a larger absolute value is derived through the rectifying means 43 to 46 from the tachometric generator 11 so that the voltage to be applied through the line 72 to the base 73 of the transistor 15 is negative. Thus, the current flows through the relay coil 26 to cause an arm 74 of the relay switch 30 to contact with an output terminal 75, thereby producing a throttle control signal at an output terminal 76, indicating that the engine speed is above the third synchronized speed and that the throttle valve should be closed to decrease the engine speed. When the engine speed sufficiently decreases up to the particular synchronized speed, the transistor 15 turns non-conductive to switch back the arm 74 of the relay switch 30 to another output terminal 77. This indicates that the engine speed is equalized with the particular speed so that the shafting to the second speed should be effected and that the throttle valve should be reset to the normal position.

It is advantageous, on the other hand, that if the gear is shifted in a manner mentioned above, particularly in case of a manually controlled transmission of a sliding gear type using a dog clutch so that the dog clutch is engaged thereat, the load of the synchronizer used may be lighter to avoid the shifting shock because the engine speed can almost reach the synchronized speed.

Figure 2:
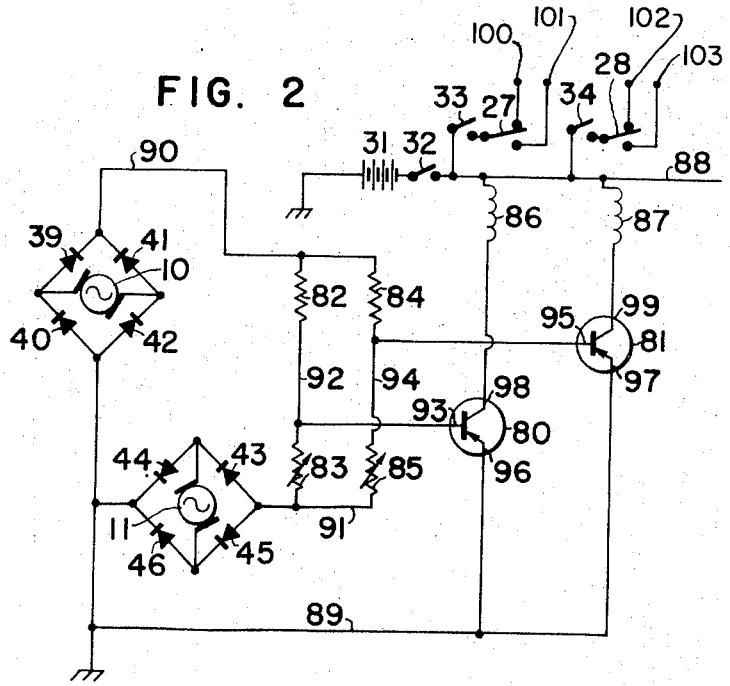
FIG. 2 is a connection diagram of a modification of the device shown in FIG. 1, which is applicable in effecting only downshiftings.

A modified simple form of the circuit connection of the control device shown in FIG. 1 is now illustrated in FIG. 2, in which the like parts and components are indicated by the same numerals as those shown in FIG. 1. The modified device comprises a first and second speed sensing means 10 and 11, respectively, d.c. storage battery 31, power switch 32, governor switches 33 and 34, rectifying means 39, 40, 41, 42, 43, 44, 45 and 46, PNP transistors 80 and 81 similar to those 12 and 13 shown in FIG. 1, resistor elements 82, 83 and 84, 85 similar to those 16, 17 and 18, 19 and 20 shown in FIG. 1 for setting the base potential of the transistors 80 and 81, respectively, relay coils 86 and 87 similar to those 23 and 24 shown in FIG. 1. The resistance ratios of the resistor elements 82 and 83 and of the resistor elements 84 and 85 can be respectively preset to determine first and second gear ratios to which the transmission is only shifted down.

It is advantageous that if the gear is shifted particularly in the manually controlled transmission of a sliding gear type using a dog clutch, the load applied to the synchronizer may be reduced to avoid the shocks when in the shifting because the engine speed reaches almost the synchronized speed.

The storage battery 31 supplies similarly to the previous embodiment a voltage to the negative line 88 and the grounded positive line. A line 89 is grounded so that the voltage thereof is zero and a line 90 is connected to one side of the bridge formed by the rectifying means 39, 40, 41 and 42 so that the positive voltage $Vc$ representative of the vehicle speed is derived from the speed sensing means 10 which is connected operatively to the output shaft of the vehicle. A line 91 is connected to one side of the bridge formed by the rectifying means 43, 44, 45 and 46 so that the negative voltage $Ve$ representative of the engine speed is derived from the speed sensing means 11 which is operatively connected to the output shaft of the engine. The voltage $Vc$ is proportional to the vehicle speed or turbine shaft speed, and the voltage $-Ve$ is proportional to the engine speed. A line 92 is connected through the resistor element 82 to the line 90 and through the resistor element 83 to the line 91 and is also connected to the base 93 of the transistor 80. A line 94 is connected through the resistor element 84 to the line 90 and through the resistor element 85 to the line 91 and is also connected to the base 95 of the transistor 81. Thus the conductions of the transistors 80 and 81 are controlled by the potentials at the lines 92 and 94, that is, the potentials of the bases 93 and 95 thereof. These two transistors 80 and 81 are provided with the emitters 96 and 97, and the collectors 98 and 99, respectively. There are also provided output terminals 100, 101, 102 and 103.

When, in operation, a downshift is to be effected, from the third to second speed, the governor switch 34 is closed by the signal from the governor (not shown) which is separately provided. Here, the gear ratio is lower at the third speed than in the second, the engine rotates at a speed lower than the second synchronized speed during the shifting from the third to second speed. Thus, the speed sensing means 11 produces a voltage $Vc$ lower than the suitable level at which the particular downshift is carried out so that the voltage in the line 94 connected to the base 95 of the transistor 81 is positive. Thus the transistor 81 is non-conducting so that the relay coil 87 is not excited. In this instance, the governor switch 34 is closed by the shifting signal supplied from the governor. The relay switch 28 is consequently connected to the output terminal 102, indicating that the engine speed is lower than the particular synchronized speed and providing at the terminal 102 a throttle control signal dictating that the throttle valve of the engine should be opened wider. Thus, when the engine speed increases to a sufficient valve, the negative voltage $Ve$ derived from the speed sensing means 11 increases in its absolute value, so that the potential of the base 95 of the transistor 81 decreases through zero to the negative. As a result, transistor 81 becomes conducting and the collector current flows through the relay coil 87. Thus the relay switch 28 is connected to the output terminal 103 with the governor switch 34 kept closed to thereby produce a second synchronized signal indicating that the engine speed is equalized with the second synchronized speed and that the throttle valve should accordingly be reset to the normal position. In this state, even in the manually controlled transmission, the engine speed which is equalized in this way with the synchronized speed and therefor the downshifting may be accomplished.

When, now, the vehicle speed decreases in the second speed selected in the transmission, the governor switch 33 will be closed by a signal from the governor. The gear ratio being smaller in the second speed than in the first speed, the engine rotates at a speed lower than the synchronized speed during the shifting from the second to first speed. The speed sensing means 11 therefore, produces a negative voltage $Ve$ lower than the voltage at which the particular downshift is effected so that the potential at the base 93 of the transistor 80 is positive. Thus the transistor 80 is non-conducting and, as a result, the relay coil 86 is not excited. The relay switch 27 is connected to the output terminal 100 with the governor switch 33 kept closed, indicating that the engine speed is lower than the particular first synchronized speed. There is also produced at the terminal 100 a throttle control signal dictating that the throttle valve should accordingly be opened wider. As the engine speed increases to reach the particular synchronized speed, the negative voltage $Ve$ derived from the speed sensing means 11 increases in its absolute value and the base potential of the transistor 80 decreases through zero to negative so that the transistor 80 becomes conducting. The collector current, therefore, flows through the relay coil 86. Accordingly, the relay switch 27 is connected to the other output terminal 101 with the governor switch kept closed, indicating that the engine speed is equalized with particular synchronized speed and that the throttle valve should be reset to the normal position.

Figure 3:
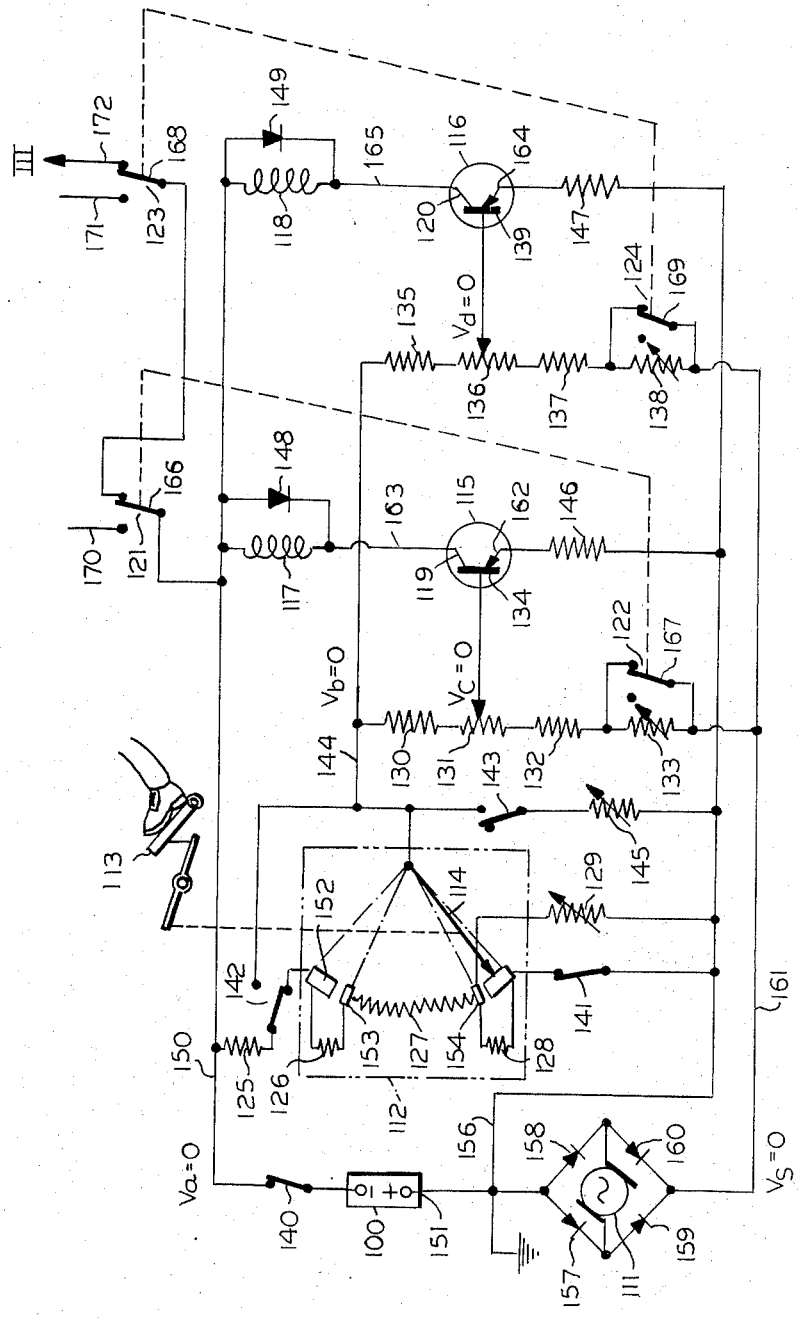
FIG. 3 shows a known control device for generating shift signals which may be used to actuate governor switches of the device shown in FIG. 1, and FIGS. 4 and 5 show a known throttle valve control arrangement that may be used in connection with this invention.

Referring now to FIG. 3, there is shown the control device of copending application Ser. No. 872,124, which control device generates a first speed current signal when the transmission is to be conditioned in its first speed at a terminal 170, a second speed current signal when the transmission is to be conditioned in its second speed at a terminal 171 and a third speed current signal when the transmission is to be conditioned in its third speed at a terminal 172. These current signals may be used to actuate the corresponding governor switches 33, 34 and 35 in such a manner that the governor switches 33, 34 and 35 are closed by the respective current signals at terminals 170, 171 and 172. The control device further comprises a d.c. power source or storage battery 110, a voltage generator means having tachometric generator 111 connected to a driven or output shaft of the vehicle such as the wheel and bridge rectifier axle, a variable resistor means element 112 for producing a signal voltage corresponding to the position of an accelerator pedal 113 for controlling the position of the throttle valve (not shown) in the vehicle engine and mechanically linked with the wiper arm 114 of the variable resistor element 112, PNP transistors 115 and 116 for determining the shifting point between the first or low and the second or intermediate speeds, and between the second or intermediate and the third or high speeds, respectively, power relay coils 117 and 118 for switching the delivery of the speed shifting signal when energized by the current flowing through a collectors 119 and 120 of the transistors 115 and 116, respectively so that contacts or relay switches 121, 122 and 123, 124 of the relays 117 and 118 are switched, respectively.

In order to provide a proper output voltage, there are provided resistor elements 125, 126, 127, 128 and 129 for setting the potential output from the variable resistor element 112, which resistors are all in series with each other and connected between the positive and negative terminals of the storage battery 110.

There are also provided resistor elements 130, 131, 132 and 133 for setting the potential for a base 134 of the transistor 15, and also provided resistor elements 135, 136, 137 and 138 for setting the potential for a base 139 of the transistor 116.

This device also comprises a power switch 140 for switching the d.c. potential from the storage battery 110 to the control circuit. A switch 141 changes a shifting pattern so as to shift, if closed, the speed ratio at higher vehicle speed when the vehicle is on an ascent or when an engine braking is required or when the engine is operating at a low temperature. Switches 142 and 143, when actuated, hold the low speed range in the transmission so that the potential of a circuit line 144 is set by the resistor element 125 and variable resistor element 145.

This device further comprises emitter resistor elements 146 and 147 for setting the current flowing through the transistors 115 and 116, respectively.

In order to protect the transistors 115 and 116 against overcurrent, diodes 148 and 149 are connected in parallel with the coils 117 and 118, respectively, in the collector circuit of the transistors 115 and 116.

The storage battery 110 supplies voltage $Va$ through a line 150 and a grounded line 151. The variable resistor element 112 includes, as shown, a plurality of sliding contacts 152, 153, 154 and 155 spaced from each other. The positive terminal of the battery 110 is connected with the resistor element 138 through a grounded line 156. This terminal is also connected with rectifying elements 157 and 158 connected in parallel and rectifying elements 159 and 160 connected in series with the elements 157 and 158, respectively. These rectifying elements are all connected with the output of the tachometric generator 111 to supply a d.c. voltage which is proportional to the driven shaft speed of the vehicle. A reference voltage $Vb$ is built up by the resistor element 125, switch 142, variable resistor element 112, resistor element 126, contact 153, resistor element 127, contact 154, resistor element 128, sliding contact 155, and switch 141 connected to the circuit line 150 and 156, which reference voltage $Vb$ is fed to the bases 134 and 139 of the transistors 115 and 116, respectively. The tachometric generator 111 generates a voltage proportional to the revolution speed of the driven shaft (which may actually be the wheel axle). The voltage is rectified by the rectifying elements 157, 158, 159 and 160 connected in a bridge form to provide a reference voltage $Vs$ which is also fed to the base 134 of the transistor 115. The resistor element 30, variable resistor element 31, resistor element 132 and variable resistor element 133 connected to the line 144 with the voltage $Vb$ and a line 161 with the voltage $Vs$ builds up a reference voltage $Vc$ which is applied directly to the base 134 of the transistor 115. The resistor element 135, variable resistor element 136, resistor elements 137 and 138 connected to the lines 144 and 161 establish reference voltage $Vd$ which is fed directly to the base 139 of the transistor 116. The transistor 15 includes an emitter 162, connected, through the resistor element 146 to the line 156 and collector 119 connected through the relay coil 117 and diode 148 in parallel to the line 150. The transistor 116, similarly, includes an emitter 164 connected through the resistor element 147 to the line 156 and collector 120 connected through the relay coil 118 and diode 149 in parallel to the line 150.

In operation, when the power switch 140 is closed, the negative voltage $Va$ is applied to the line 150. If, now, the accelerator pedal 13 of the vehicle is depressed, the wiper arm 14 of the variable resistor element 112 turns clockwise from the position seen in FIG. 3 so that a negative voltage $Vb$ is applied through the arm 114 to the line 144.

Figure 4:
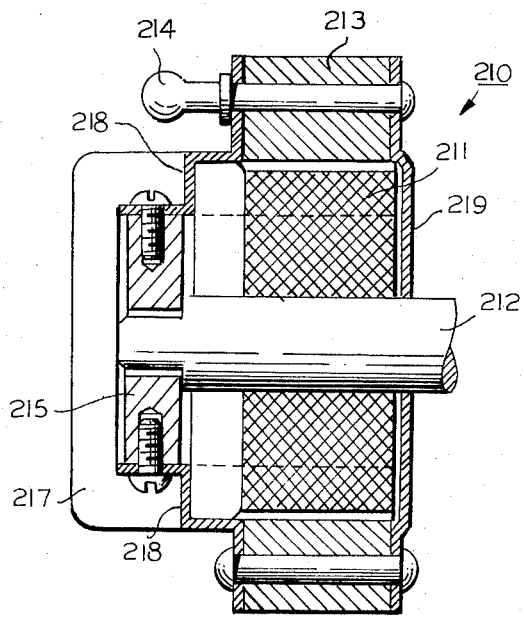
Figure 5:
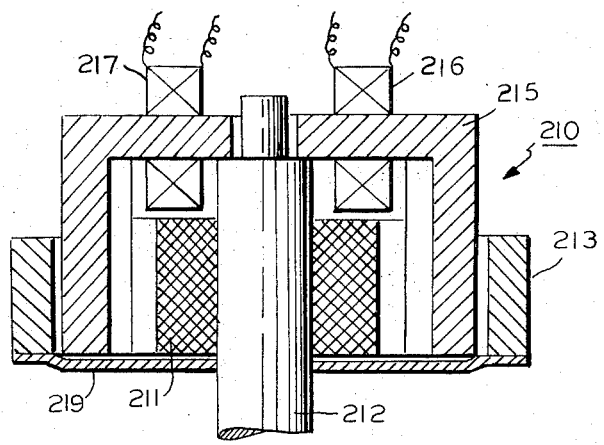

FIGS. 4 and 5 illustrate the operation of one of the prior art throttle valve control arrangement which may be used in connection with this invention. There is shown a device 210 having a rotary permanent magnet 211 carried on a shaft 212 of the throttle valve (not shown), a magnet 213 for producing a longitudinal magnet field and connected by a pin 214 with the accelerator pedal (not shown) through a linkage (not shown), an electromagnet 215 having a plurality of coils 216 and 217 for producing a lateral magnetic field, a support 218 for connecting said permanent magnet 13 with said electromagnet 215, another support 219 disposed opposite to the permanent magnet 213 and rotatably engaged with said shaft 212.

In operation of the thus constructed device, when an electric current is absent in the coils 216 and 217, the magnet 211 attracts the magnet 213. Since the magnet 213 is connected by the pin 214 with an accelerator pedal (not shown), if the accelerator pedal is depressed, the motion of the magnet 213 is carried to the permanent magnet 211 so that the permanent magnet 211 rotates around the shaft 212 of the throttle valve, which is consequently opened or closed.

When the coil 216 or 217 is energized by the electric current to cause the electromagent 215 to be magnetized, the magnetic force of the electromagnet 215 is combined with that of the magnet 213 with the result that the plane of the magnetic field is deviated from its normal position and causes the magnet 211 to rotate to a deviated position as a result of this attraction. Accordingly, the shaft 212 of the throttle valve is actuated to cause the throttle valve to be opened or closed. In this instance, the coils 216 and 217 are so disposed as to produce magnetic fields opposite to each other so that, if the current flows in one coil, the throttle valve is opened and, if the current flows in the other coil, the throttle valve is closed.

If desired, the coils 216 and 217 may be so arranged as to produce magnetic fields in the same direction and permit the current to flow alternately in the coils, thereby to open or close the throttle valve.

It is now apparent from the foregoing description that the control device according to the present invention is useful to shorten the shifting time period by generating a throttle control signal for opening and closing the throttle valve to thereby synchronize the engine speed with the corresponding synchronized speed and to thereby minimize the shocks which might otherwise occur as a result of improper discrepancy between the two speeds while in the shifting to be effected.

According to an advantage of the present invention, the automatic transmission can be controlled so as to decrease the hydraulic pressure in the hydraulic control circuit while in the shifting to diminish the shocks. This advantage is disclosed in a whole automatic transmission system in the applicant's copending Pat. application Ser. No. 872,124.

According to another advantage of the invention, the conventional large and powerful synchronizer may be eliminated or at least may be compactized particularly in a large-sized transmission as of a sliding gear type using a dog clutch, since the shifting can be accomplished at the very time that the engine speed is equalized with the particular synchronized speed.

According to still another advantage of the invention, the engagement of the clutches and brakes in the automatic transmission can be controlled to be effected after a shifting down from the higher to lower gear ratio has been carried out particularly in a transmission using the clutches and brakes in the low speed gears, thus minimizing the shifting shock.

According to still another advantage of the invention, a manually controlled transmission, where used, can be controlled so as to effect a shiftdown from a higher to lower gear ratio with the capability of double clutching under the control of the throttle valve especially if the manually controlled transmission is of a large-sized type.

While a few embodiments of the invention have been shown and described in detail, it will be apparent to those skilled in the art that such are by way of illustration only and numerous changes may be made thereto without departing from the spirit and scope of the present invention, which is defined by the appended claims.

What is claimed is:

1. In an electronic control device for synchronized gear shifting in a variable speed transmission for a vehicle driven by an engine, in which means are provided for generating a first d.c. voltage proportional to the speed of rotation of an output shaft of the transmission and second d.c. voltage proportional to the speed of rotation of an output shaft of the engine, respectively, the combination comprising, a d.c. energy source, a first switch providing a first asynchronous signal when open, a second switch connected in series with said first switch, said second switch providing a synchronous signal for a particular gear ratio of the transmission when open with said first switch being closed, said second switch providing a second asynchronous signal when closed with said first switch being closed, said first asynchronous signal indicating that the engine speed is below a synchronous speed for the particular gear ratio, said second asynchronous signal indicating that the engine speed is above the synchronous speed, a governor switch electrically connecting said d.c. energy source with said first switch when closed, a voltage divider system electrically connected to said d.c. voltage generating means and including at least a first resistor, a second resistor and a third resistor interconnected in series, said resistors having predetermined resistance ratios, a first transistor having its emitter grounded and its base electrically connected between said first and second resistors of said voltage divider, a second transistor having its emitter grounded and its base electrically connected between said second and third resistors of said voltage divider, a first solenoid coil electrically connected at one end to said d.c. energy source and at the other end to the collector of said first transistor for actuating said first switch, and a second solenoid coil electrically connected at one end to said d.c. energy source and at the other end to the collector of said second transistor for actuating said second switch.

\* \* \* \* \*